US006047163A

United States Patent [19]

Miyoshi

[11] Patent Number: 6,047,163

[45] Date of Patent: Apr. 4, 2000

[54] MINIATURE RADIO APPARATUS HAVING LOOP ANTENNA INCLUDING HUMAN BODY

[75] Inventor: Tatsuo Miyoshi, Chiba, Japan

[73] Assignee: Seiko Instruments R& D Center Inc., Japan

[21] Appl. No.: 08/802,224

[22] Filed: Feb. 19, 1997

[30] Foreign Application Priority Data

Feb. 20, 1996 [JP] Japan .................................... 8-032395

[51] Int. Cl.[7] ........................................................ H04Q 7/14

[52] U.S. Cl. ........................................... 455/31.1; 455/100

[58] Field of Search .................................... 455/419, 420, 455/31.1, 31.2, 31.3, 100, 120, 351; 343/718

[56] References Cited

U.S. PATENT DOCUMENTS

| | | | |
|---|---|---|---|
| 3,329,957 | 7/1967 | Hoynes | 343/718 |
| 3,623,161 | 11/1971 | Yokahama | 343/702 |
| 3,736,591 | 5/1973 | Rennels et al. | 343/702 |
| 3,983,483 | 9/1976 | Pando | 325/16 |
| 4,123,756 | 10/1978 | Nagata et al. | 343/702 |
| 4,625,212 | 11/1986 | Oda et al. | 343/702 |
| 5,014,040 | 5/1991 | Weaver et al. | 340/572 |
| 5,225,846 | 7/1993 | Koyama | 343/718 |

*Primary Examiner*—Dwayne D. Bost
*Assistant Examiner*—Alan T. Gantt
*Attorney, Agent, or Firm*—Adams & Wilks

[57] ABSTRACT

A miniature radio apparatus for use in transmission or reception of electic waves has a pair of antenna terminals insulated from each other. The pair of antenna terminals are so formed as to be brought into contact with, or to be capacitively-coupled to, different parts of the human body, respectively. One of the pair of antenna terminals is formed so as to be brought into contact with one of the arms, ears, or fingers of the user. The miniature radio apparatus also has a detection/control device for detecting whether the antenna terminals are in contact with, or capacitively-coupled to, different parts of the human body, respectively, and controlling the transmission or reception of electric waves. Consequently, it is possible to obtain a practical gain, and also to enlarge the range of communication so that the quality of communication is improved. It is, furthermore, possible to receive electric waves without an arm band antenna.

6 Claims, 4 Drawing Sheets

MINIATURE RADIO APPARATUS HAVING LOOP ANTENNA INCLUDING HUMAN BODY

BACKGROUND OF THE INVENTION

1. Field of the Invention

The present invention relates to miniature radio apparatuses, which are capable of being mounted on the human body or carried by hand and which transmit or receive electric waves.

2. Description of Related Art

Recently, with the increasing trend of intensification of information, the spread of miniature radio apparatuses which allow the user thereof to communicate with anybody at anytime and in any place has been accelerated in every country. Particularly, the pager has made a rapid growth on a global level and there are various kinds of pager configurations including box, pencil and watch types.

In these radio apparatuses, the built-in antenna is an indispensable element and the loop antenna as representing it is chiefly used. Of these apparatuses, the watch type radio apparatus cannot have a sufficient antenna length so that it uses a ferrite antenna as in the case of an AM radio or a conductor to be inserted into a watch band so as to be put to practical use as an antenna.

In FIG. 1, there is shown the principle of a loop antenna.

The tuning to the reception frequency is made through the inductor and the capacitor interposed between conductors a and e shown in FIG. 1. The wave is then supplied from taps a b to a reception circuit. As is well known, the reception sensitivity is determined by the material of the conductor, the quality of the condenser C, and the aperture area of the antenna. The larger the aperture area the higher the antenna gain.

Similarly, an equivalent circuit at the time when a watch band is used as an antenna is shown in FIG. 2. Reference numeral 20 designates the body of a miniature radio apparatus, reference numeral 21 designates a clock circuit and a control section, reference numeral 22 designates a reception circuit and reference numerals 23 and 24 designate band halves each in the form of a belt made of a conductive material such as copper and partly insulated by an insulating material such as a plastic to prevent it from contacting the human body.

Reference letters e and g designate connections of the band halves forming a band and the body 20 of the miniature radio apparatus, at which connections, the band halves are mechanically connected with the miniature radio apparatus, and an electric wave is introduced electrically to the reception circuit 22 through a matching circuit.

It should be noted that in FIG. 2, the matching circuit determines the resonant frequency through the capacitor C, and the frequency is drawn from taps of the terminals a and b.

Reference letter f is a clamp for electrically and mechanically connecting the band halves 23 and 24 together. This clamp is made of a material having a low level of high frequency resistance and a high degree of durability.

Thus, the loop antenna has conventionally been formed in the above manner. However, the antennas using this band have had the following various problems.

Thus, in the case of miniature radio apparatuses, particularly the wrist watch type radio apparatus, if the wrist band is used as an antenna, the following problems have arisen. That is:

Since the open area is small, sufficient antenna gain cannot be obtained. Especially when a FM multiplex apparatus having a low level of frequency is used, the antenna gain lowers.

The open space surrounded by the band changes depending on the physical size of the user which results in changing the antenna gain. Particularly, when the user is a female or a child, it remarkably deteriorates.

The apparatus and the band have to be electrically coupled, so that specially-designed band is required. Therefore, the user can not use a band to his liking.

If contact points of the band deteriorate or have contact resistance, the antenna gain deteriorates.

Since there are contact parts between the apparatus and the band, it is difficult to, provide a sufficiently waterproof device.

Since the antenna material is put in the band, the band looses its flexibility and becomes uncomfortable.

Since the band has no flexibility, the durability of the band is poor.

Since the antenna is of the magnetic field type, the resonance quality becomes high so that it becomes necessary to make an automatic frequency adjustment depending on the size of the user's wrist and the circuit and the system becomes complicated.

Since the band has electrically connected parts, a particular,connecting metal becomes necessary and the user feels it, uncomfortable and difficult to wear.

In the above-described miniature radio apparatus, it has been thought that it is not possible to miniaturize the apparatus while keeping a high gain. Such tendency has been particularly remarkable in the case of the wrist watch for use with a FM frequency band having a large wavelength. To take one example, in the conventional FM multiplex pager, antenna gain thereof was, as compared with the $\frac{1}{2}\gamma$ dipole, about −30 dB, namely, the relative gain was about −30 dBd, and the performance of the apparatus was not good for its outfit. For this reason, it has been usual that the reception sensitivity of the whole apparatus became worse resulting in the deterioration of the communication quality thereof.

Further, although an electric field type antenna having one of its pair of terminals connected to the human body when in use, when it is used with a miniature radio apparatus for receiving a long wavelength FM band, it has been usual that since the area of the circuit is small, the false ground for constructing the electric field type antenna is insufficient and it is not possible to obtain a favorable gain.

Although an example of paging for receiving a radio wave has been described above, the problem involved therein is the same as in the case of a miniature security radio transmitter/receiver which is capable of transmission by pressing an emergency button.

SUMMARY OF THE INVENTION

It is an object of the present invention to provide a miniature radio apparatus. The miniature radio apparatus according to the present invention is constructed such that it is provided with a pair of antenna terminals, so that the reception or transmission of electric waves is performed by bringing each of the terminals into contact with, or capacitively coupled (hereinafter referred to as capacity-coupled) to, different parts of the human body.

DETAILED DESCRIPTION OF THE PREFERRED EMBODIMENTS

One embodiment of a miniature radio apparatus especially when the apparatus is used with a wrist-watch will now be described.

Figure 1:
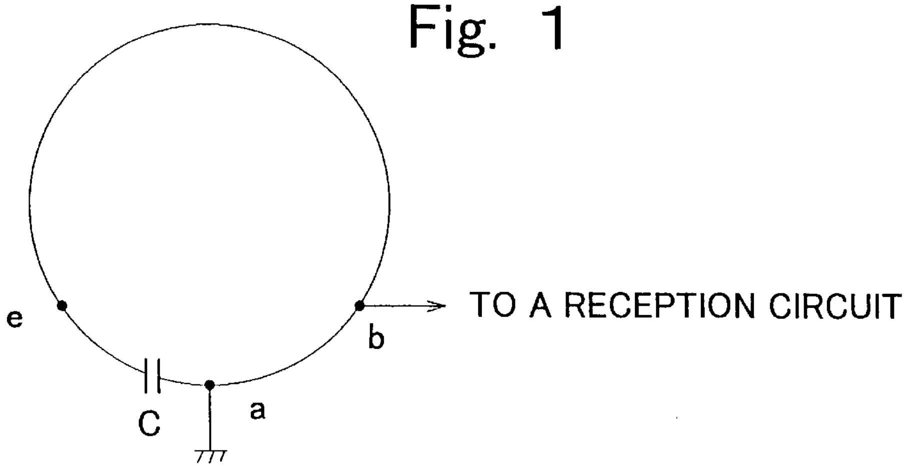
FIG. 1 is a diagram illustrating the principle of a loop antenna.
Figure 2:
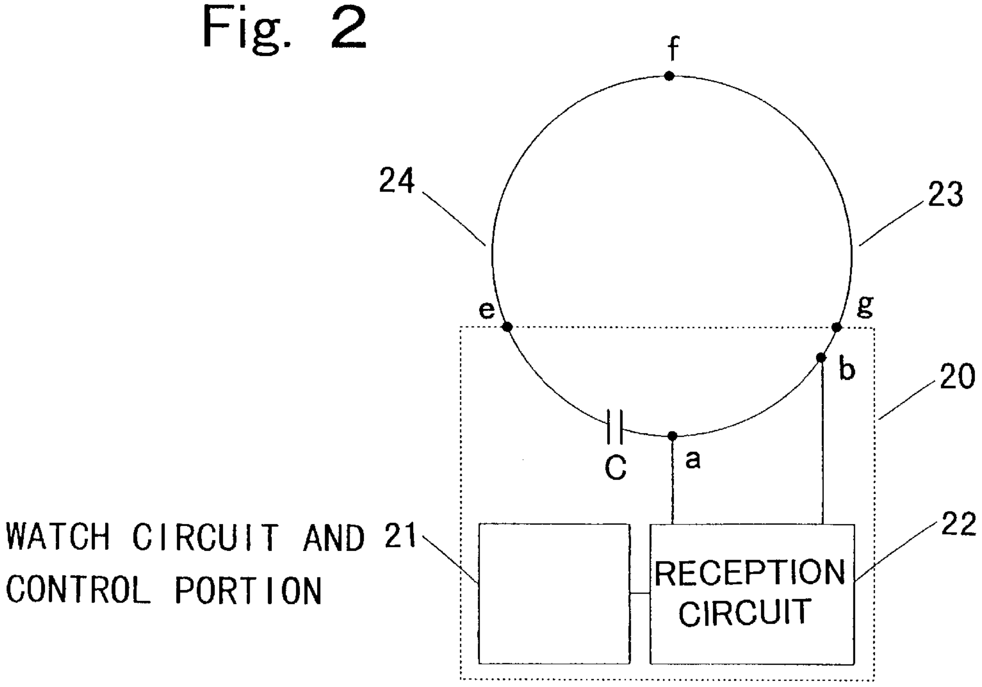
FIG. 2 is an equivalent circuit diagram when a watch band is used as an antenna.
Figure 3:
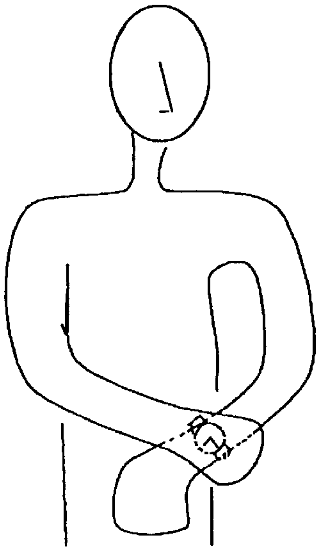
FIG. 3 is a diagram showing a state in which a person uses a miniature radio apparatus according to the present invention for receiving a radio wave.

FIG. 3 shows a state in which an electric wave is received by a person using the miniature radio apparatus according to the present invention. The user wears the wrist watch on his left arm with his right hand applied to a ring surrounding the periphery of the dial plate of the wrist watch.

Figure 5:
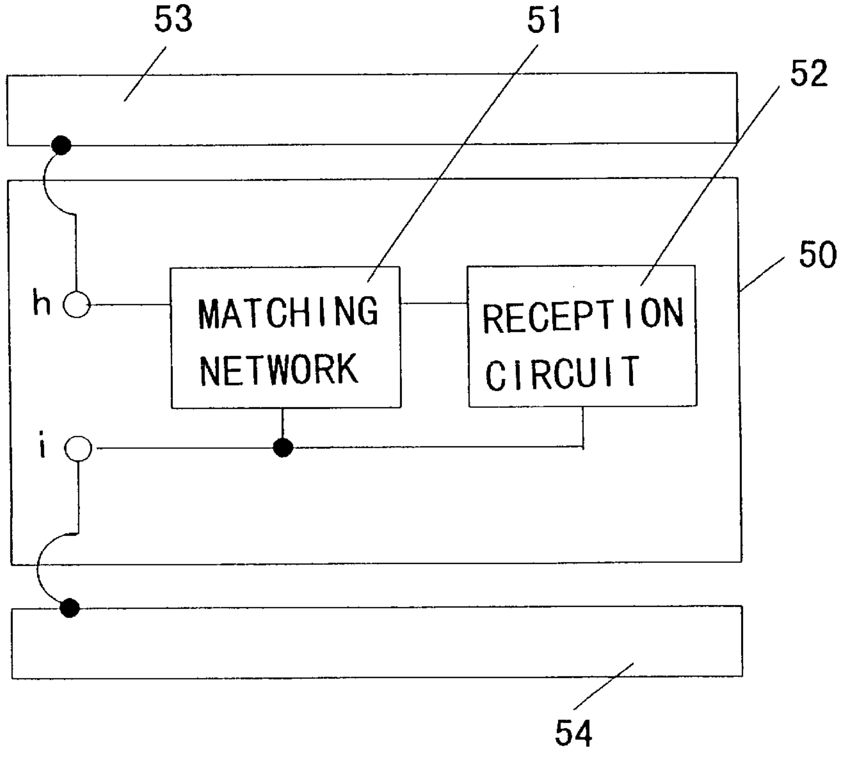
FIG. 5 is a diagram illustrating an outline of the miniature radio apparatus according to the present invention.

FIG. 5 shows an example for illustrating an outline of the end portion of the apparatus of the present invention.

Figure 4:
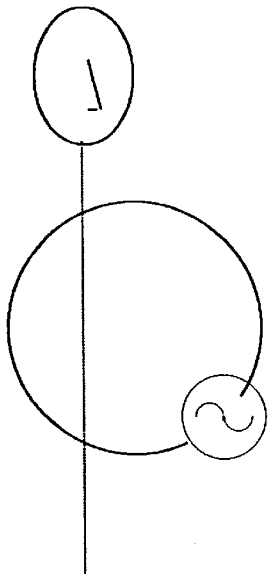
FIG. 4 is an equivalent circuit diagram corresponding to FIG. 3.

Reference numeral 51 designates a matching circuit, reference numeral 52 designates a reception circuit, reference numerals 53 and 54 designate terminal plates and reference letters h and i designate the inputs to be received. For example, when the user wears the terminal 54 on his left arm and touches the terminal 53 with his right hand, a loop-like antenna can be formed through his right arm, left hand, left shoulder and right shoulder as shown by the equivalent circuit in FIG. 4. A more concrete example will be described by referring to FIGS. 6 and 7.

Figure 6:
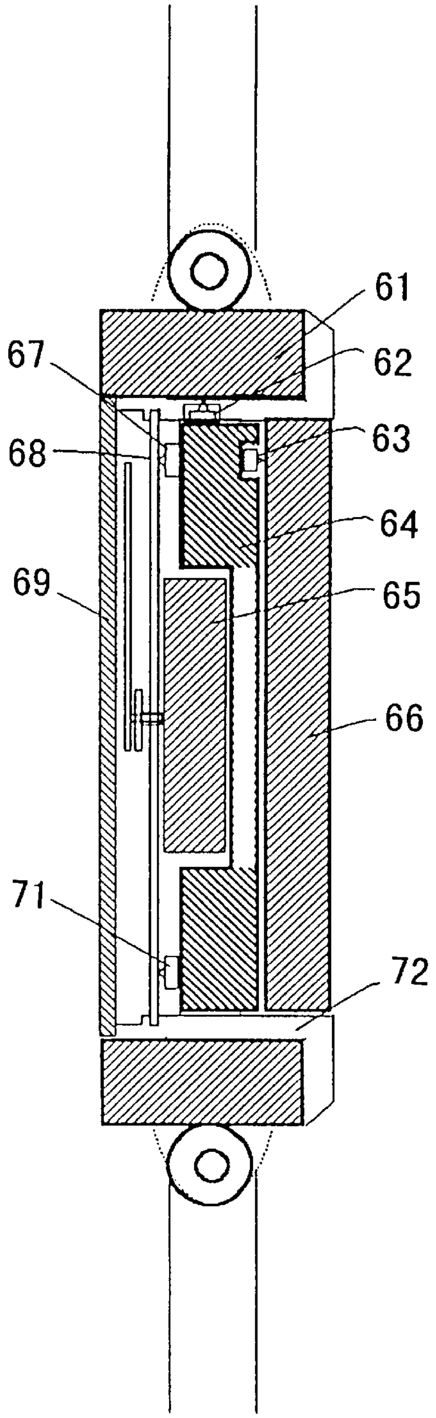
FIG. 6 is a cross sectional view of one embodiment of a miniature radio apparatus according to the present invention.
Figure 7:
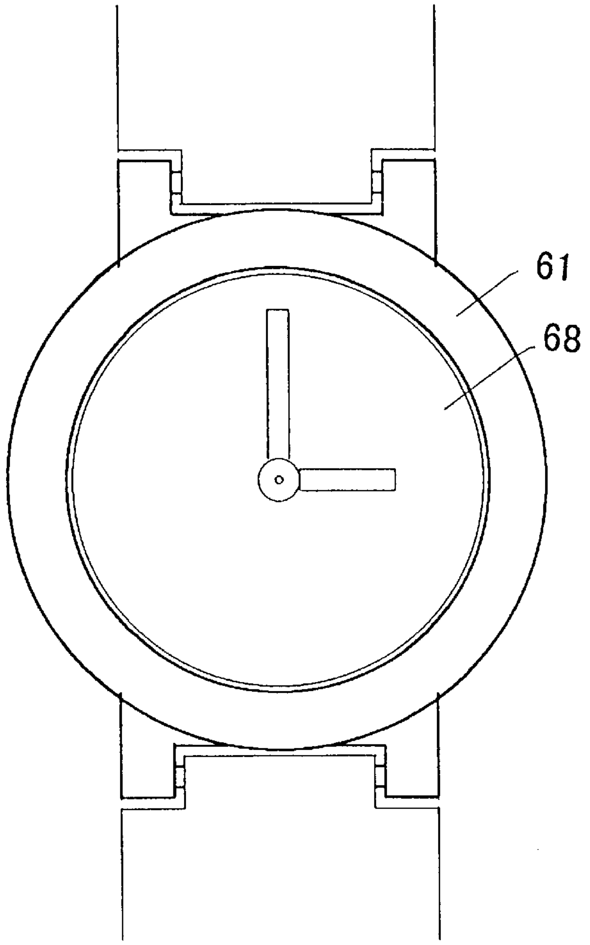
FIG. 7 is a top plan view of the embodiment of the miniature radio apparatus shown in FIG. 6.

FIG. 6 is a cross sectional view of a wrist-watch type miniature radio apparatus according to the present invention, and FIG. 7 is a top plan view thereof. Reference numeral 61 designates a watch outer ring made of a metal plated with a material of a low electrical resistance. Reference numeral 66 designates a rear cover made of a plated metal. Reference numeral 72 designates an insulating ring made of a plastic having the function of electrically insulating the rear cover 66 from the outer ring 61. Reference numeral 64 designates a circuit block in which circuits of various types such as the matching circuit, the reception circuit, and the control circuit are contained. Reference numeral 65 is a time counting mechanism of the watch for driving the hands. Reference numerals 62 and 63 are antenna terminals, respectively, of which the terminal 62 is connected to the outer ring 61 and the terminal 63 is electrically connected to the rear cover 66. Reference numerals 67 and 71 designate push-springs, reference numeral 68 designates a dial plate and reference numeral 69 designates a glass plate.

Thus, with the above-arrangement, when the outer ring 61 and the rear cover 66 are touched upon, an electric wave is supplied to the reception circuit. Further, although in the instant embodiment the outer ring and the rear cover are used as the antenna terminals, there are various modes for using them so that, for example, where the miniature radio apparatus is of the box type, the antenna terminals may be provided on the left and right sides.

Figure 8:
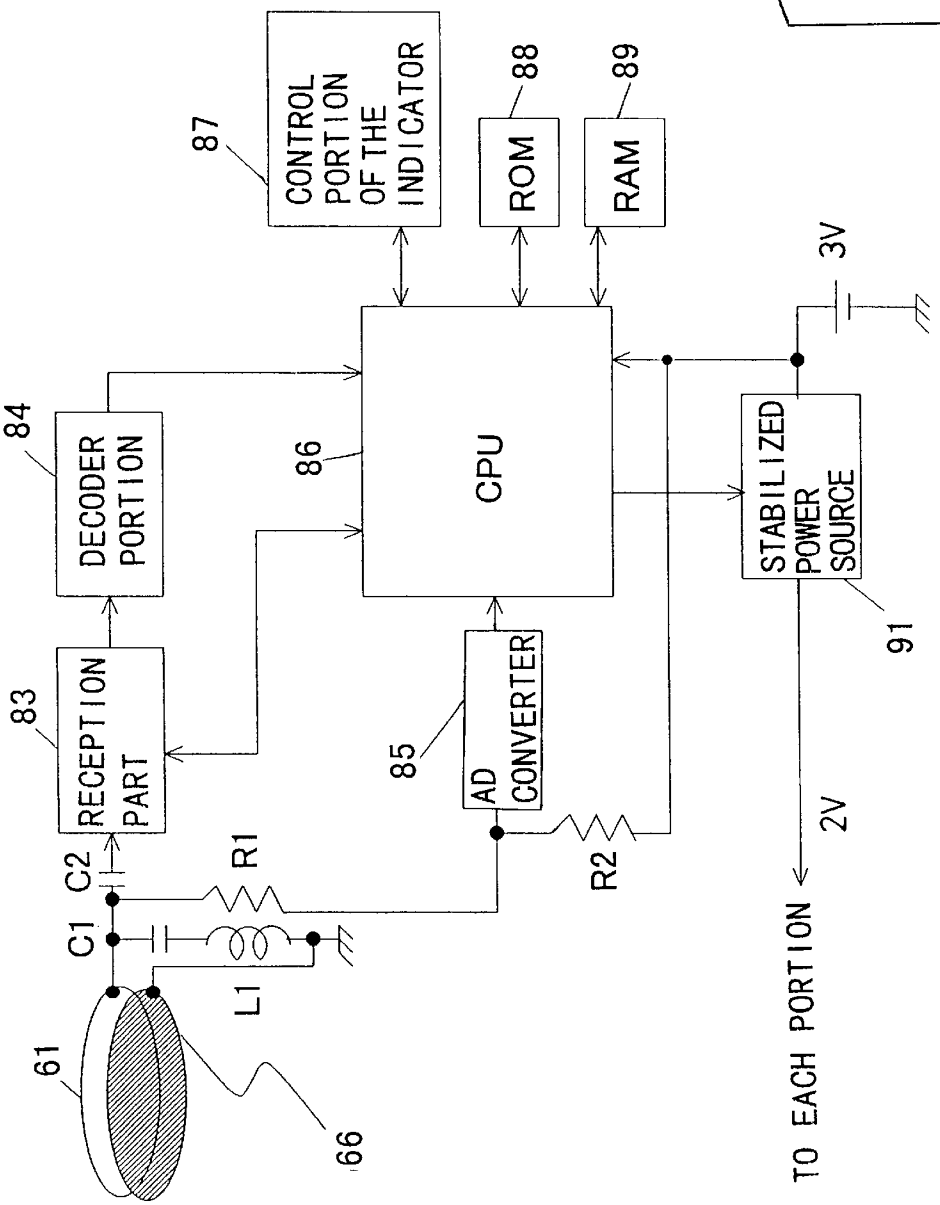
FIG. 8 is a block diagram of a circuit of the embodiment shown in FIG. 6.

In FIG. 8 there is shown a circuit block diagram of the embodiment of the miniature radio apparatus according to the present invention. The operation of the circuit when the miniature radio apparatus according to the present invention is mounted on the left arm of the user will be described with reference to FIG. 8.

The reference numeral 61 designates the outer ring and reference numeral 66 designates the rear cover. As described before, for example, an electric wave induced to an antenna, which is formed of the rear cover 66, the left hand, the left shoulder, the right shoulder and the right arm of the user and the outer ring 61, is matched to the reception frequency at a capacitor C1 and a coil La. In the instant embodiment, further, C1 and L1 have values of 36 pF and 0.39 $\mu$H, respectively, which are tuned at about 80 MHz and matched to the reception circuit through the capactor C2. Note that the capactor C2 has a value of 16 pF.

Resistors R1 and R2 are bias circuits for use with a touch sensor, and in the instant embodiment, R1 and R2 have values of 2 mega ohms and 4 mega ohms, respectively. Touching the outer ring 61, the resistance between the outer ring 61 and the rear cover 66 lowers due to the resistance of the human body. This resistance is measured as around 2 mega ohms, though there is a mere or little difference between users. If the outer ring 61 is not touched by hand the input voltage to an AD converter 85 is nearly 3 V because of the absence of any current flowing through the resistor; however, since the input voltage of the AD converter 85 is divided into ½ of it by touching the outer ring by hand, the result will be that about 1.5 V is added.

A CPU 86 intermittently monitors the input voltage of the AD converter 85 and, if the input voltage becomes a value below a prescribed voltage level and moreover is such condition continues for a prescribed period, the CPU 86 controls each part of the circuit so as to receive the electric wave. That is, it drives a stabilized power source 91, and then drives the reception part 83 and a decoder portion 84, and receives the prescribed data from the electric wave. Further, in the instant embodiment the intermittent monitoring time is every 100 msec, and the prescribed voltage level and prescribed period are 2 v and 1second, respectively.

In the instant embodiment, time correction information, weather forecasts, or temperature information are included in prescribed data so that as occasion demands, the indicators are driven to correct time, or the weather forecast or the temperature information is shown by the position of indicator.

If the outer ring is touched upon for over 1 second, for example, the apparatus receives prescribed data and the CPU 86 controls an indicator control section 87 on the basis of the program and displays the temperature and weather markings given on the dial 68 in advance whereby an estimated temperature and weather forecast are displayed. Then, after a lapse of 5 seconds from the time when the user's hand has left the outer ring, the CPU 86 controls the indicator control section 87 on the basis of the program to display a correct time based on the prescribed data.

Reference numeral 88 designates a ROM which stores the software of the CPU, and reference numeral 89 designates a RAM that is necessary for the treatment by the CPU.

Thus, by hand touch, necessary radio information can be received by a miniature radio apparatus worn on the arm.

Figure 9:
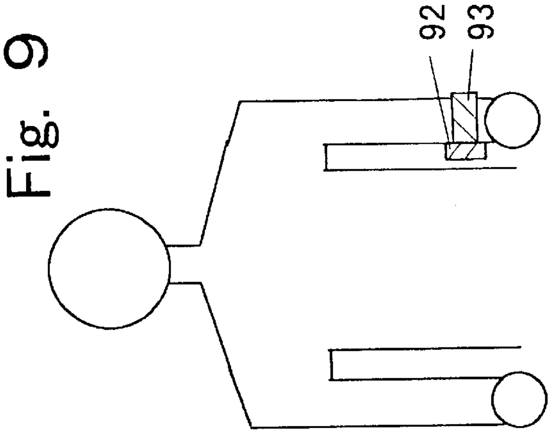
FIG. 9 is an illustration of another embodiment of the miniature radio apparatus according to the present invention.

In FIG. 9 there is shown another embodiment of the present invention in which a watch band 92 having a watch band 93 is capacity-coupled to a human body. Since in this embodiment a watch 92 and the human torso are capacity-coupled, a loop is formed between the human torso by attaching the watch 92 to the inside of the human body. Stated otherwise, the watch 92 is attached to the left arm so that the watch 92 is disposed between the left arm and the torso of the human body. In the instant embodiment, a procedure such as receiving specified information periodically through the operation of the CPU is programmed, for example, as receiving once every 30 seconds, prescribed data can be received periodically without the user intentionally placing his hand on the watch. Thus, by so doing it is not only possible to positively receive a radio wave, but also ring a bell or to give vibrations whenever necessary as in the case of a pager.

Further, although the embodiments of the present invention have been described by taking an example of a mechanical information timepiece, the invention can also be used with a digital display type timepiece using a liquid crystal panel.

The present invention can also be applied to transmitters used for security purposes or other bi-directional communication equipment.

The foregoing description of the preferred embodiments of the present invention has been made with respect to cases where the apparatus is mounted on the arm of the user but the present invention can be similarly applied to a finger an earring.

In conclusion, there are several distinct features of the miniature radio apparatus of the present invention.

First, as mentioned above, since an antenna with a large open space is formed by a combination of one of the pair of antenna terminals—the left hand—the left shoulder—the right shoulder—the right arm of the user the—other of antenna terminals, and an electric wave can be supplied to the antenna terminals, a practical gain (around −25 dBd) can be obtained even by the miniature radio apparatuses, such as the wrist-watch with which no sufficient ground is obtainable. Therefore, it is possible to enlarge the communication range or to improve the quality of communication even in micro-radio apparatuses.

Second, since the electric wave can be received without using an arm band antenna, the following advantages result:

It is not necessary to connect the apparatus with the band, so that a desired band can be used;

No sensitivity deterioration takes place due to an increasing contact resistance resulting from the corrosion of contact points of the band antenna;

Sufficient waterproof characteristics can be maintained due to the absence of contact parts between the apparatus and band;

Since the antenna material is not needed to be put into the band, the flexibility of the band is good and also the sense of wearing of the band is good;

Since the usual band can be used, the durability thereof is good and also the band can be obtained with ease;

No excessive deterioration of sensitivity takes place even where the apparatus is used by a female or child having thin arms;

Since the Q value of resonance is not so high, it is not necessary to automatically tune the frequency depending on the thickness of the user's arm, and the circuit and the system can be simplified; and Since the band has no electrically connecting part, no connecting metal is needed, and also it is easily mounted on the human body.

Furthermore, the present invention is applicable not only to radio apparatuses of the arm type, but also to radio apparatuses of the finger- or earring type. Thus, the effects of the present invention are extremely, significant.

What is claimed is:

1. A miniature radio apparatus having a pair of antenna terminals insulated from each other, the antenna terminals being respectively brought into contact with, or capacitively-coupled to, different parts of the human body during use of the miniature radio apparatus.

2. A miniature radio apparatus comprising: a pair of antenna terminals insulated from each other, the antenna terminals being respectively brought into contact with, or capacitively-coupled to, different parts of a human body for reception or transmission of electric waves; and detection/control means for detecting that the antenna terminals have been brought into contact with, or capacitively-coupled to, different parts of the human body, and for controlling the transmission or reception of the electric waves.

3. A miniature radio apparatus according to claims 1 or 2; wherein one of the pair of antenna terminals is capable of being brought into contact with one of the arms of a person using the miniature radio apparatus.

4. A miniature radio apparatus according to claims 1 or 2; wherein each of the pair of antenna terminals can be touched by a person using the miniature radio apparatus.

5. A miniature radio apparatus according to claims 1 or 2; wherein one of the pair of antenna terminals is capable of being attached to the ear of a person using the miniature radio apparatus.

6. A miniature radio apparatus according to claims 1 or 2; wherein one of the pair of antenna terminals is capable of being attached to one of the fingers of a person using the miniature radio apparatus.

* * * * *